(12) United States Patent
Nishimura et al.

(10) Patent No.: US 8,199,261 B2
(45) Date of Patent: Jun. 12, 2012

(54) PROJECTION DISPLAY APPARATUS WHICH ENABLES MISREGISTRATION BETWEEN PRIMARY COLOR LIGHTS PROJECTED ON A SCREEN TO BE REDUCED

(75) Inventors: Koichiro Nishimura, Kanagawa (JP); Yoshitake Kondo, Kanagawa (JP)

(73) Assignee: Sony Corporation, Tokyo (JP)

( * ) Notice: Subject to any disclaimer, the term of this patent is extended or adjusted under 35 U.S.C. 154(b) by 829 days.

(21) Appl. No.: 12/220,022

(22) Filed: Jul. 21, 2008

(65) Prior Publication Data
US 2009/0027567 A1 Jan. 29, 2009

(30) Foreign Application Priority Data
Jul. 25, 2007 (JP) .............................. P2007-193790

(51) Int. Cl.
H04N 3/22 (2006.01)
H04N 17/00 (2006.01)
G03B 21/14 (2006.01)
G03B 21/28 (2006.01)

(52) U.S. Cl. ............. 348/745; 348/189; 353/31; 353/69

(58) Field of Classification Search .................. 348/189, 348/745; 353/31, 69; 349/7, 9
See application file for complete search history.

(56) References Cited

U.S. PATENT DOCUMENTS

| 6,877,859 B2* | 4/2005 | Silverstein et al. | 353/20 |
| 7,379,124 B2* | 5/2008 | George et al. | 348/745 |
| 2002/0060754 A1* | 5/2002 | Takeuchi | 348/745 |
| 2003/0123031 A1* | 7/2003 | Nelson et al. | 353/31 |

FOREIGN PATENT DOCUMENTS

| JP | 5-014843 A | 1/1993 |
| JP | 08-201937 A | 8/1996 |
| JP | 2004-015599 A | 1/2004 |
| JP | 2005-345870 A | 12/2005 |
| JP | 2006-174184 A | 6/2006 |
| JP | 2006-270507 A | 10/2006 |

* cited by examiner

Primary Examiner — Victor Kostak
(74) Attorney, Agent, or Firm — Lerner, David, Littenberg, Krumholz & Mentlik, LLP (57) ABSTRACT

The present invention provides a projection display apparatus realizing easy recognition of the effect of registration adjustment. The projection display apparatus includes: a light source; a spatial light modulation device modulating, on the basis of a video signal, each of primary color lights for color display emitted from the light source; projecting means for projecting, onto a screen, each of the primary color lights modulated by the spatial light modulation device; and correcting means for correcting, based on a given correction value, the video signal for each of the primary color lights so as to reduce misregistration between the primary color lights projected on the screen, and supplying the corrected video signal to the spatial light modulation device. Validation/invalidation of correction on the video signal by the correcting means is switched in accordance with an operation from the user.

3 Claims, 7 Drawing Sheets

PROJECTION DISPLAY APPARATUS WHICH ENABLES MISREGISTRATION BETWEEN PRIMARY COLOR LIGHTS PROJECTED ON A SCREEN TO BE REDUCED

CROSS-REFERENCE TO RELATED APPLICATIONS

The present application claims priority from Japanese Patent Application No. JP 2007-193790, filed in the Japanese Patent Office on Jul. 25, 2007, the entire content of which is incorporated herein by reference.

BACKGROUND OF THE INVENTION

1. Field of the Invention

The present invention relates to a projection display apparatus applied to a liquid crystal projector or the like.

2. Description of the Related Art

A projection display apparatus (for example, a liquid crystal projector) is being spread, which displays a picture by spatially modulating incident light on a spatial light modulation device in accordance with an electric signal applied to the spatial light modulation device, outputting the modulated light, and collecting and projecting the outgoing light. Such a projection display apparatus has generally a lamp as a light source, a condenser, and an illumination optical system for condensing light generated from the lamp and the condenser and making the condensed light enter the spatial light modulation device. Light from the spatial light modulation device is projected by a projection lens onto a screen or the like.

Among such projection display apparatuses, in an apparatus for combining three primary color light of red light (R), green light (G), and blue light (B) (so-called 3-modulation-panel projection display apparatus), variations may occur in the precision and the like of fixation of an optical system. In this case, there is an issue such that out-of-color-registration occurs due to misregistration between primary color lights in a display image projected on a screen. To reduce out-of-color-registration caused by optical-mechanism factors, a projection display apparatus having a registration adjusting function of electrically correcting out-of-color-registration has been proposed (for example, Japanese Unexamined Patent Application Publication No. H08-201937).

SUMMARY OF THE INVENTION

The user performs the registration adjustment by entering an adjustment value to reduce misregistration along the horizontal direction (H direction) or the vertical direction (V direction) with respect to each of the primary color light of red light, green light, and blue light at each of adjustment points on a screen while seeing out-of-color-registration on a display screen projected on the screen.

In the registration adjusting function of the related art, however, the adjustment value once entered has to be reset (initialized) in the case of adjusting misregistration on the screen and, after that, confirming the adjustment effect, or in the case of invalidating the adjustment value once. That is, the operation of confirming the effect in the registration adjustment is very complicated, so that it is not easy to confirm the effect.

It is therefore desirable to provide a projection display apparatus realizing easy confirmation of an effect of registration adjustment.

According to an embodiment of the present invention, there is provided a projection display apparatus including: a light source; a spatial light modulation device modulating, on the basis of a video signal, each of primary color lights for color display emitted from the light source; projecting means for projecting, onto a screen, each of the primary color lights modulated by the spatial light modulation device; and correcting means for correcting, based on a given correction value, the video signal for each of the primary color lights so as to reduce misregistration between the primary color lights projected on the screen, and supplying the corrected video signal to the spatial light modulation device. Validation/invalidation of correction on the video signal by the correcting means is switched in accordance with an operation from the user.

In the projection display apparatus according to the embodiment of the present invention, light generated from the light source is modulated by the spatial light modulation device on the basis of a video signal for each of the primary color lights, and the modulated primary color lights are projected onto the screen, thereby displaying a video image based on the video signal. The video signals for each of the primary color lights are corrected so as to reduce the misregistration between the primary color lights projected on the screen, and the corrected video signals are supplied to the spatial light modulation device. Thus, occurrence of out-of-color-registration caused by the misregistration between the primary color lights is suppressed, and the display quality improves. In addition, validation/invalidation of correction on the video signal is switched in accordance with an operation from the user. Consequently, for example, in a state where correction is made invalid, correction with the input correction value is not actually performed, but a video image displayed on the basis of a before-correction video signal is held.

In the projection display apparatus of the embodiment of the present invention, the video signals for each of the primary color lights are corrected so as to reduce the misregistration between primary color lights projected on a screen (registration adjustment is performed). Therefore, occurrence of out-of-color-registration caused by the misregistration between the primary color lights is suppressed, and the display quality is improved. In addition, validation/invalidation of correction of a video signal is switched according to an operation from the user. Consequently, in a state where the correction is made invalid, a video image based on a before-correction video signal is held. Unlike the technique of the related art, it is unnecessary to reset the correction value (adjustment value) once entered. Therefore, the effect of the registration adjustment may be easily confirmed.

Other and further objects, features and advantages of the invention will appear more fully from the following description.

DETAILED DESCRIPTION OF THE PREFERRED EMBODIMENTS

An embodiment of the present invention will be described in detail hereinbelow with reference to the drawings.

Figure 1:
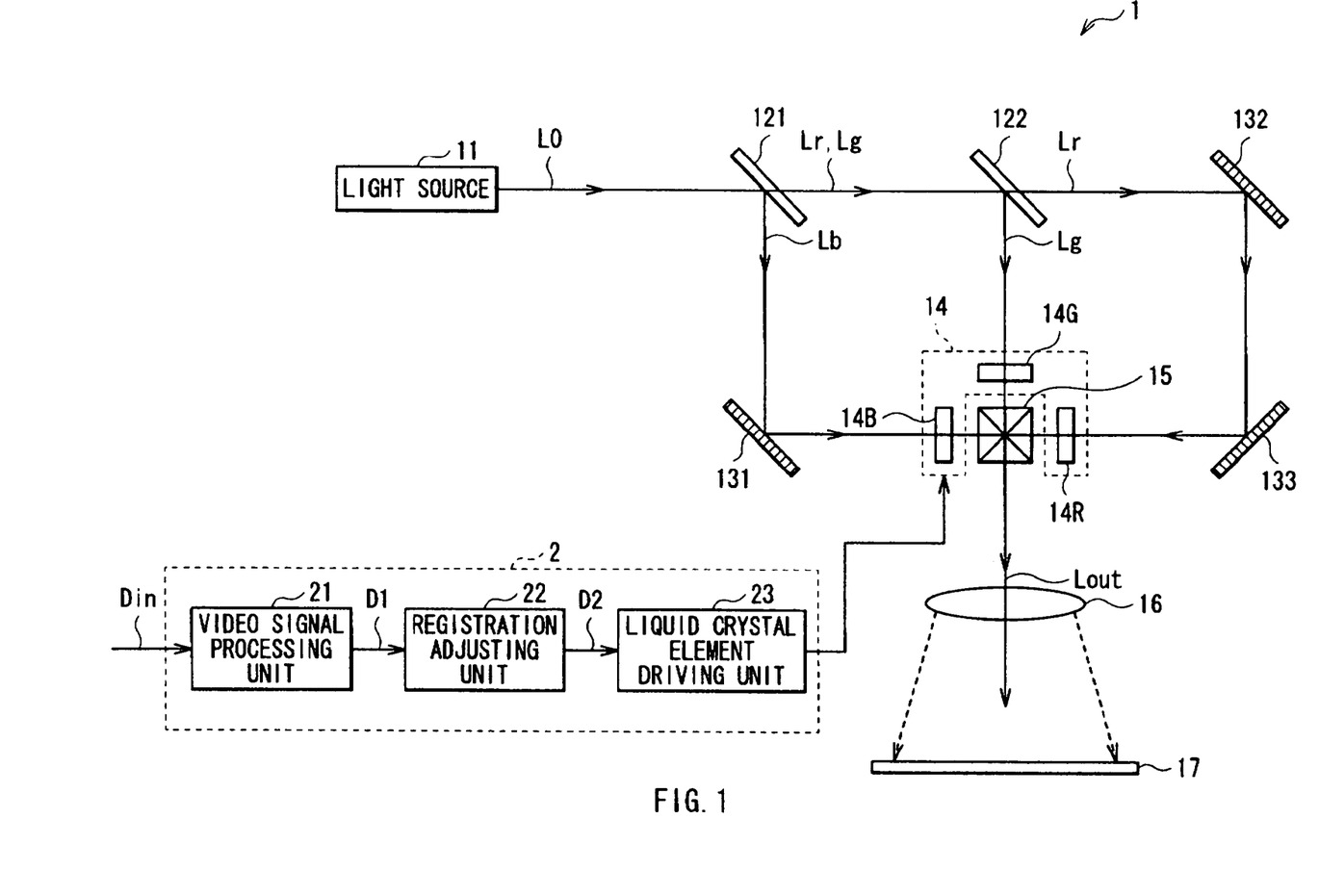
FIG. 1 is a block diagram showing the configuration of a projection display apparatus as an embodiment of the present invention.

FIG. 1 shows a general configuration of a projection display apparatus (liquid crystal projector 1) as an embodiment of the present invention. The liquid crystal projector 1 displays a video image on the basis of an input video signal Din supplied from the outside. The liquid crystal projector 1 includes a light source 11, dichroic mirrors 121 and 122, reflection mirrors 131, 132, and 133, a light modulator 14, a dichroic prism 15, a projection lens 16, a screen 17, and a control unit 2 for controlling the light modulator 14 on the basis of the input video signal Din.

The light source 11 generates white light (irradiation light L0) including primary color light of red light Lr, green light Lg, and blue light Lb which is necessary to display a color image. The light source 11 is configured by, for example, a halogen lamp, a metal halide lamp, a xenon lamp, or the like.

The dichroic mirror 121 transmits the red light Lr and the green light Lg in the irradiation light L0 generated from the light source 11 and reflects the blue light Lb, so that the red light Lr and the green light Lg travels while being separated from the blue light Lb. The dichroic mirror 122 transmits the red light Lr out of the red light Lr and the green light Lg passed through the dichroic mirror 121 and reflects the green light Lg, thereby making the red light Lr and the green light Lg travel while being separated from each other. The green light Lg reflected by the dichroic mirror 122 travels toward the light modulator 14.

The reflection mirror 131 reflects the blue light Lb reflected by the dichroic mirror 121 toward the light modulator 14. The reflection mirrors 132 and 133 reflect the red light Lr reflected by the dichroic mirror 122 toward the light modulator 14.

The light modulator 14 includes three liquid crystal elements 14R, 14G, and 14B corresponding to the primary color light of the red light Lr, the green light Lg, and the blue light Lb, respectively. The light modulator 14 modulates the irradiation light L0 generated from the light source 11 for each of the primary color lights (red light Lr, green light Lg, and blue light Lb) on the basis of video signals for the colors supplied from the control unit 2.

Concretely, the liquid crystal element 14R is disposed between the reflection mirror 133 and the dichroic prism 15 and modulates the incident red light Lr on the basis of the video signal for red supplied from the control unit 2. The liquid crystal element 14G is disposed between the dichroic mirror 122 and the dichroic prism 15 and modulates the incident green light Lg on the basis of the video signal for green supplied from the control unit 2. The liquid crystal element 14B is disposed between the reflection mirror 131 and the dichroic prism 15 and modulates the incident blue light Lb on the basis of the video signal for blue supplied from the control unit 2. Each of the liquid crystal elements 14R, 14G, and 14B has a structure in which, for example, a liquid crystal layer including liquid crystal molecules is sandwiched between a pair of substrates to which a drive voltage based on a video signal is applied.

The dichroic prism 15 mixes the red light Lr, green light Lg, and blue light Lb modulated by the liquid crystal elements 14R, 14G, and 14B, thereby obtaining mixture light (display light) Lout and makes the display light Lout travel along a single optical path (an optical path leading to the projection lens 16).

The projection lens 16 is disposed between the dichroic prism 15 and the screen 17 and projects the display light Lout generated by the dichroic prism 15 onto the screen 17. The screen 17 is a section to which light (display light Lout) modulated by the liquid crystal elements 14R, 14G, and 14B and projected by the projection lens 16 is projected.

The control unit 2 has a video signal processing unit 21, a registration adjusting unit 22, and a liquid crystal element driving unit 23.

The video signal processing unit 21 has the function of generating a video signal D1 (before-adjustment data D1) by performing white balance adjustment for adjusting color temperature of the input video signal Din and so-called gamma correction on the input video signal Din. By the function, adjustment to improve the quality of a display image is carried out.

When misregistration occurs between the primary color lights Lr, Lg, and Lb projected onto the screen 17, the registration adjusting unit 22 corrects the video signal D1 (before-adjustment data D1) for each of the colors corresponding to the primary color lights Lr, Lg, and Lb so as to reduce such misregistration in accordance with an adjustment value (correction value) input from the user (registration adjustment). The registration adjusting unit 22 supplies the adjusted video signal D2 (adjusted data D2) for each of the colors to the liquid crystal element driving unit 23. The details of the adjusting process performed by the registration adjusting unit 22 will be described later.

The liquid crystal element driving unit 23 drives each of the liquid crystal elements 14R, 14B, and 14G on the basis of the adjusted data D2 supplied from the registration adjusting unit 22.

Each of the liquid crystal elements 14R, 14B, and 14G corresponds to a concrete example of "spatial light modulation device" in the present invention, and the projection lens 16 corresponds to a concrete example of "projecting means" in the present invention. The registration adjusting unit 22 corresponds to a concrete example of "correcting means" in the present invention.

Figure 2:
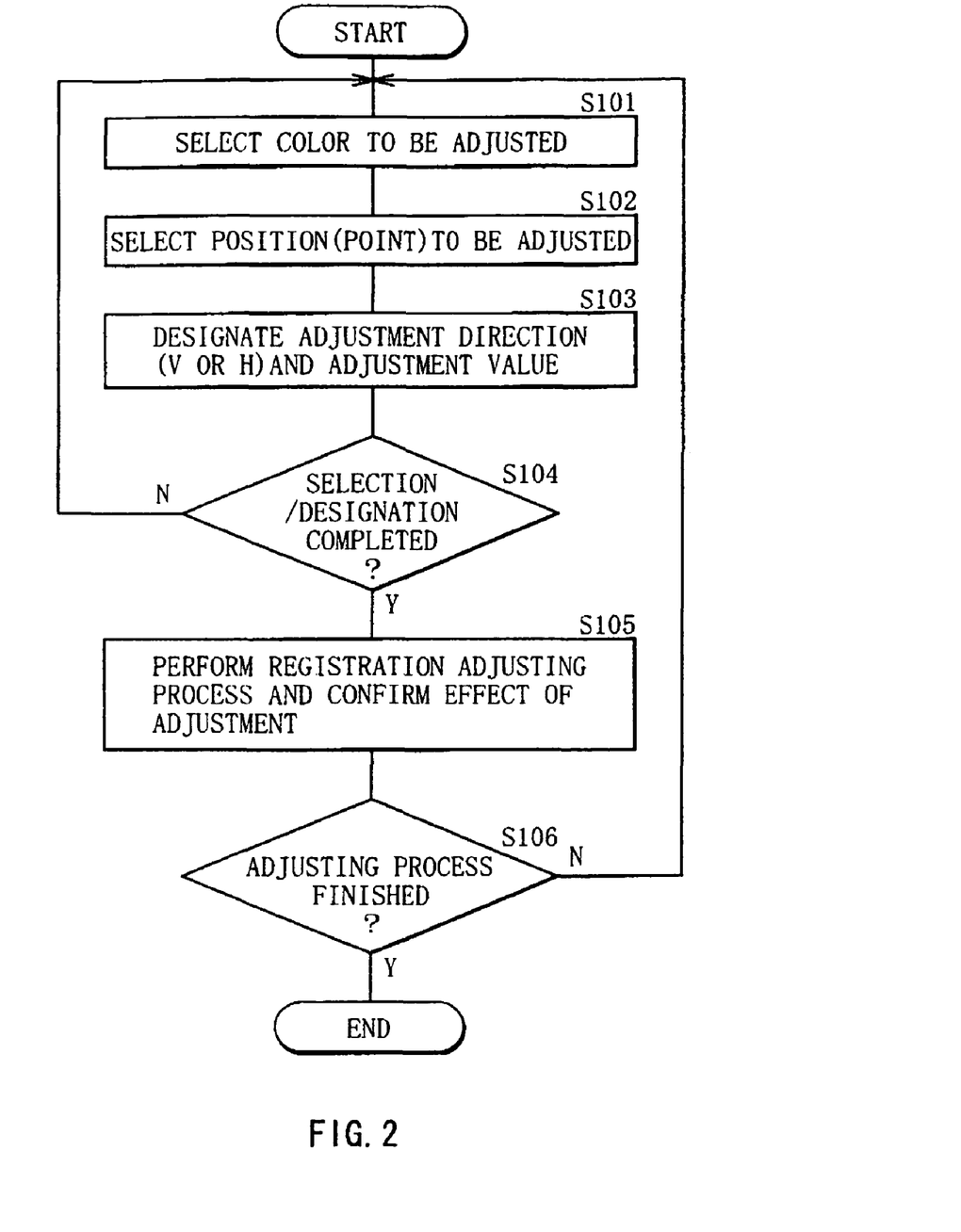
FIG. 2 is a flowchart showing an example of an adjusting process performed by a registration adjusting unit.

Referring now to FIG. 1 to FIGS. 7A and 7B, the operation of the liquid crystal projector 1 of the embodiment will be described in detail. FIG. 2 is a flowchart showing an example of the adjusting process performed by the registration adjusting unit 22. FIG. 3 to FIGS. 7A and 7B show an example of a display screen on the screen 17 in such an adjusting process.

In the liquid crystal projector 1, as shown in FIG. 1, the irradiation light L0 generated from the light source 11 is split by the dichroic mirror 121 to the red light Lr and the green light Lg, and the blue light Lb. The red light Lr and the green light Lg is separated from each other by the dichroic mirror 122. The split red light Lr enters the liquid crystal element 14R via the reflection mirrors 132 and 133, the split green light Lg directly enters the liquid crystal element 14G, and the split blue light Lb enters the liquid crystal element 14B via the reflection mirror 131. The primary color lights Lr, Lg, and Lb are modulated on the basis of the video signals for the colors supplied from the control unit 2 in the liquid crystal elements 14R, 14G, and 14B, respectively. The modulated primary colors light Lr, Lg, and Lb are mixed with each other by the dichroic prism 15 and becomes the display light Lout. The display light Lout is projected by the projection lens 16 onto the screen 17, and a video image is displayed on the basis of the input video signal Din.

In the control unit 2, first, white balance adjustment and gamma correction is performed on the input video signal Din in the video signal processing unit 21, thereby generating the video signal D1.

In the registration adjusting unit 22, for example, as shown in FIG. 2, correction (registration adjustment) is performed on the video signal D1 (before-adjustment data D1) supplied from the video signal processing unit 21 in accordance with an adjustment value entered from the user. The adjusted video signal D2 (adjusted data D2) is supplied to the liquid crystal element driving unit 23.

Figure 3:
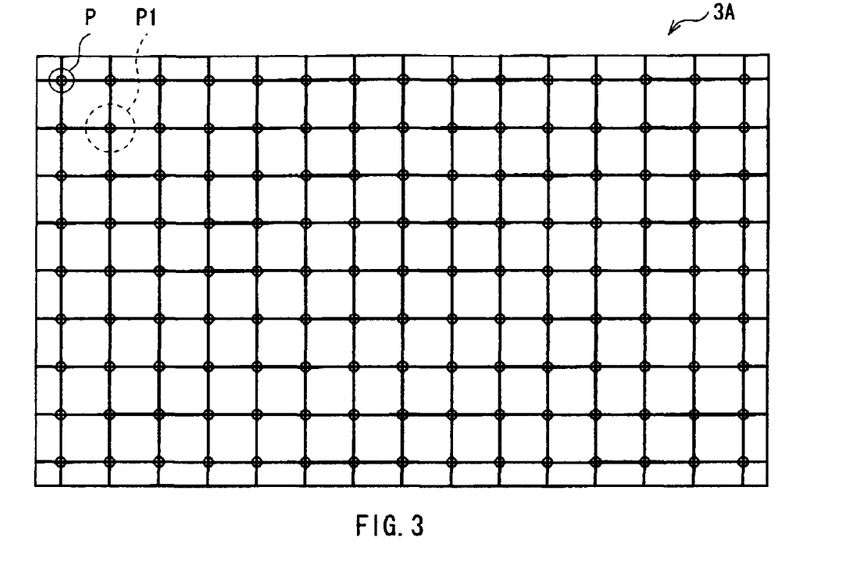
FIG. 3 is a diagram showing an example of a display screen before the registration adjustment is performed.
Figure 4:
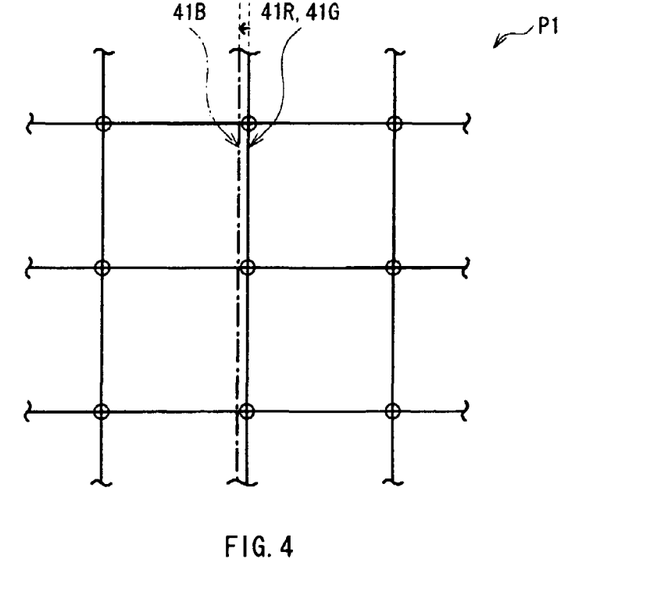
FIG. 4 is an enlarged diagram showing an example of the display screen in the case where misregistration in the horizontal direction occurs in specific primary color light.
Figure 5:
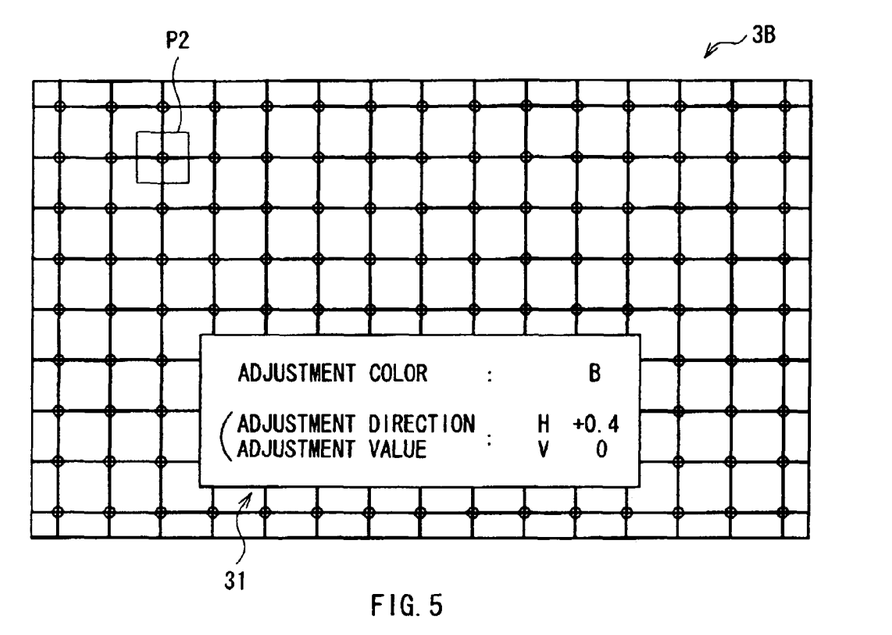
FIG. 5 is a diagram showing an example of the display screen at the time of registration adjustment in the horizontal direction.
Figure 6:
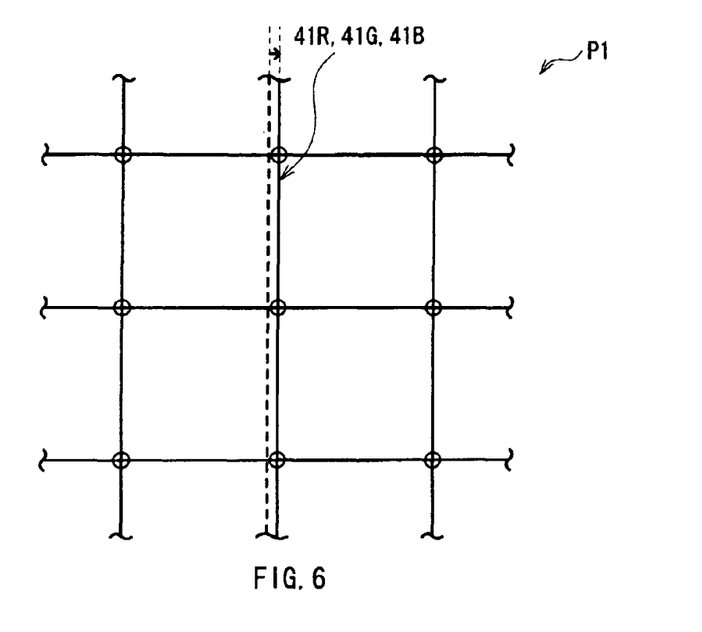
FIG. 6 is an enlarged diagram of the display screen after the registration adjustment is performed in the example of the display screen shown in FIG. 4.

Concretely, for example, as shown in a display screen 3A in FIG. 3, in the case where a plurality of adjustment points P for registration adjustment are displayed and out-of-color-registration as shown in FIG. 4 (out-of-color-registration caused by misregistration of a blue light line 41B out of a red light line 41R, a green light line 41G, and the blue light line 41B occurs only by, for example, "−0.4 point" in the horizontal direction (H direction) (0.4 point to the left)) around a reference numeral P1 in the diagram, registration adjustment is performed as follows. Specifically, first, a color to be adjusted (in this case, blue (B)) is selected by the user (step S101 in FIG. 2) on an adjustment menu 31 on a display screen 3B as shown in FIG. 5, a position (point) to be adjusted is selected similarly on the display screen 3B (in this case, an adjustment point near the reference numeral P1 is selected as a selected point P2) (step S102), and an adjustment direction (either the horizontal direction (H direction) or the vertical direction (V direction), in this case, the horizontal direction) and an adjustment value (in this case, "+0.4" point (0.4 point to the right)) are set by the user on the adjustment menu 31 (step S103), the registration adjusting unit 22 determines whether such selecting/designating process has been completed or not (step S104). In the case where the user replies that the process has not been completed (N in step S104), the program returns to the step S101 and repeats the selecting/designating process in the steps S101 to S103. On the other hand, when the user replies that the process has been completed (Y in step S104), an actual registration adjusting process is performed on the basis of the selected/designated data, and an adjustment effect recognizing process on the display screen is performed by the user (step S105). Whether the entire adjusting process is finished or not is determined by the registration adjusting unit 22 (step S106). In the case where the user instructs not to finish the entire adjusting process yet (N in step S106), the program returns to the step S101 and repeats the processes in the steps S101 to S105. On the other hand, for example, as shown in FIG. 6, in the case where the out-of-color-registration caused by the misregistration in the horizontal direction of the blue light line 41B is reduced (eliminated), an instruction of finishing the entire adjusting process is given by the user (Y in step S106), and the entire adjusting process is finished.

As described above, in the registration adjusting unit 22, in the case where the misregistration occurs between the primary color lights Lr, Lg, and Lb projected on the screen 17, the video signals D1 for the colors corresponding to the primary color lights Lr, Lg, and Lb are corrected (registration adjustment is performed) so as to reduce the misregistration in accordance with the adjustment value or the like entered by the user. The corrected video signals D2 are supplied to the liquid crystal elements 14R, 14G, and 14B. As a result, occurrence of the out-of-color-registration caused by the misregistration between the primary color lights Lr, Lg, and Lb is suppressed, and display quality improves.

Figure 7A:
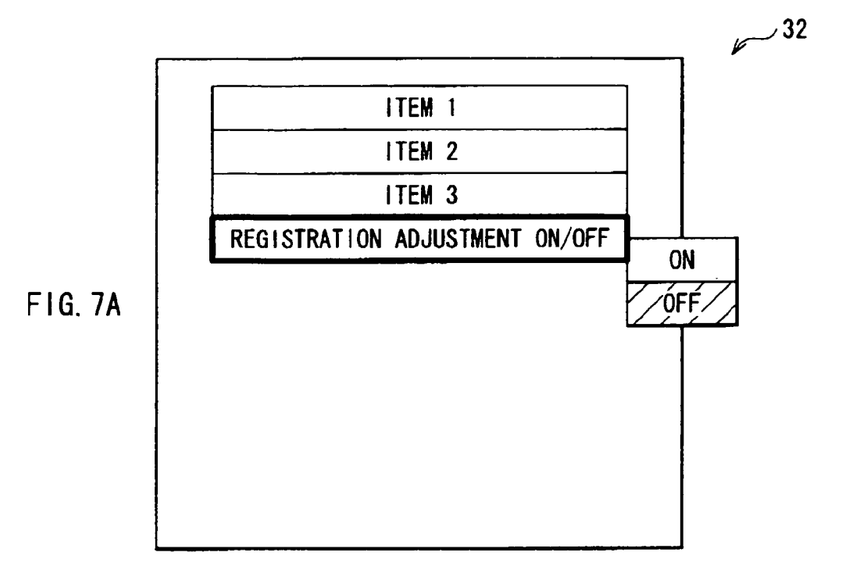
FIGS. 7A and 7B are diagrams for explaining the function of turning on/off the registration adjustment.
Figure 7B:
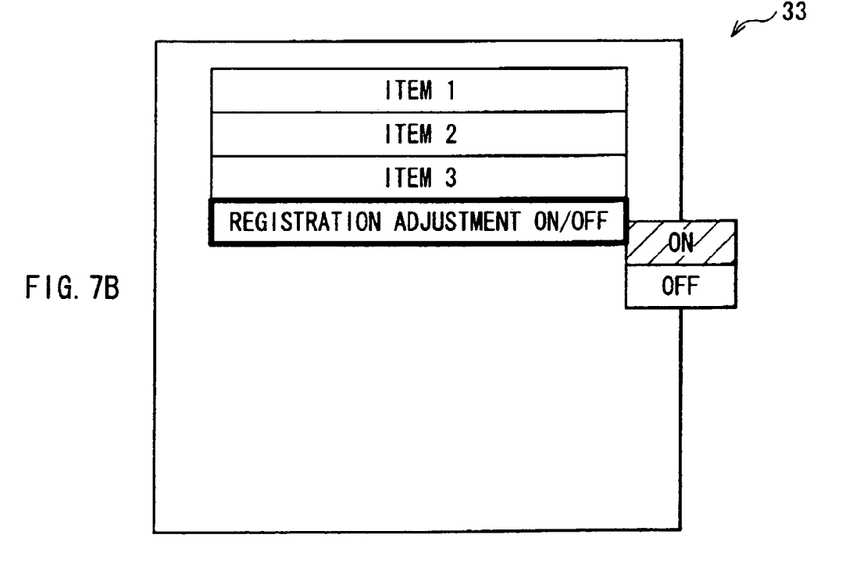

At the time of performing the registration adjustment in the embodiment, for example, by using adjustment menus 32 and 33 on the display screen as shown in FIGS. 7A and 7B, validation/invalidation (on/off) of correction on the video signal D1 may be switched according to an operation from the user. Concretely, at the time of invalidating the registration adjustment, by performing an operation (setting "off") as shown in FIG. 7A, the registration adjustment based on the adjustment value or the like entered by the user is not actually performed. A video image displayed on the basis of the before-adjustment video signal D1 is recorded on, for example, a not-shown frame memory in the registration adjusting unit 22 and held. On the other hand, in the case of validating the registration adjustment, by performing an operation (setting "on") as shown in FIG. 7B, the registration adjustment based on the adjustment value or the like entered by the user is actually performed, and a video image based on the adjusted video signal D2 is displayed. Therefore, unlike the techniques of the related art, in the case of adjusting misregistration on the screen and, after that, confirming the effect of the adjustment, or in the case of invalidating the adjustment value, it is unnecessary to reset (initialize) the adjustment value which is once entered. Thus, the operation of confirming the effect of the registration adjustment is facilitated.

In the embodiment as described above, when misregistration occurs between the primary color lights Lr, Lg, and Lb projected on the screen 17, the video signals D1 for the colors corresponding to the primary color lights Lr, Lg, and Lb are corrected (registration adjustment is performed) so as to reduce the misregistration in accordance with the adjustment value or the like entered by the user. Therefore, occurrence of the out-of-color-registration caused by the misregistration between the primary color lights Lr, Lg, and Lb is suppressed, and display quality is improved. In addition, validation/invalidation (on/off) of correction on the video signal D1 is switched according to an operation from the user. Therefore, in the state where the registration adjustment is made invalid, a video image displayed on the basis of the before-adjustment video signal D1 is held. Unlike the techniques of the related art, it is unnecessary to reset the adjustment value or the like which is once entered. Therefore, at the time of registration adjustment, its effect may be easily confirmed.

Since validation/invalidation of correction on the video signal D1 is switched by an operation on the adjustment menus 31 to 33 projected on the screen 17, the user may easily perform the switching operation.

Although the present invention has been described by the embodiment, the invention is not limited to the embodiment but may be variously modified.

Figure 8:
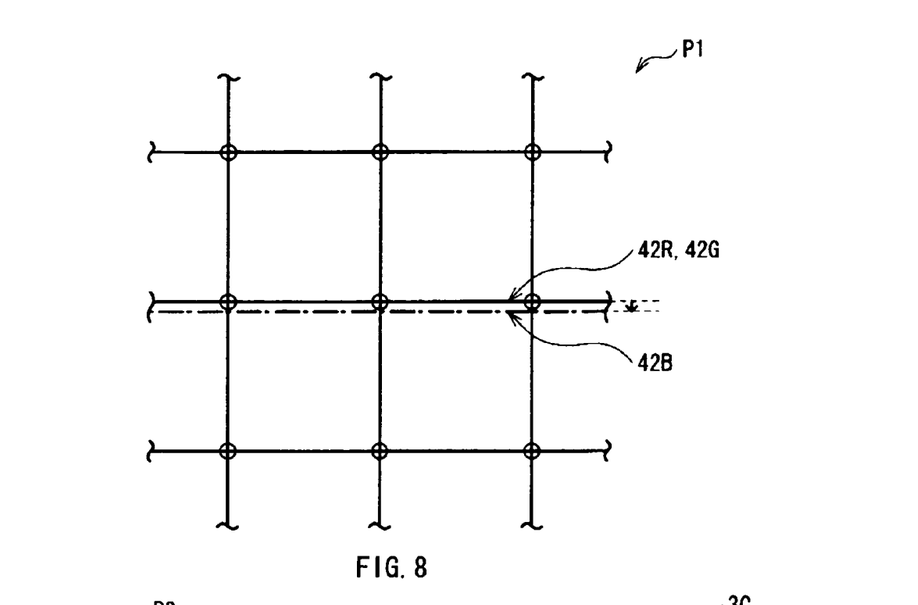
FIG. 8 is an enlarged diagram showing an example of a display screen in the case where misregistration in the vertical direction occurs in specific primary color light.
Figure 9:
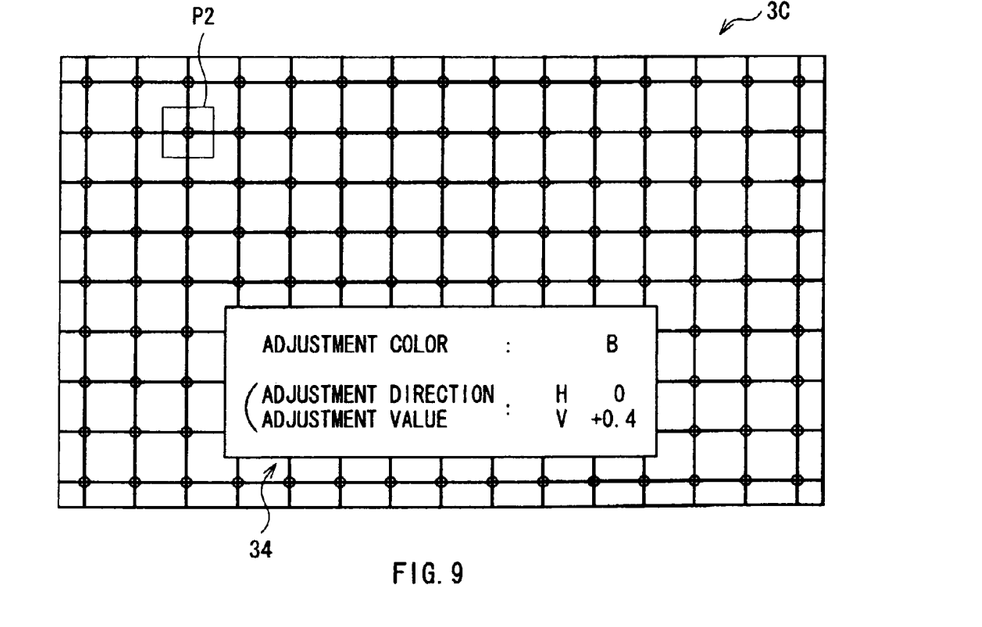
FIG. 9 is a diagram showing an example of a display screen at the time of performing registration adjustment in the vertical direction.
Figure 10:
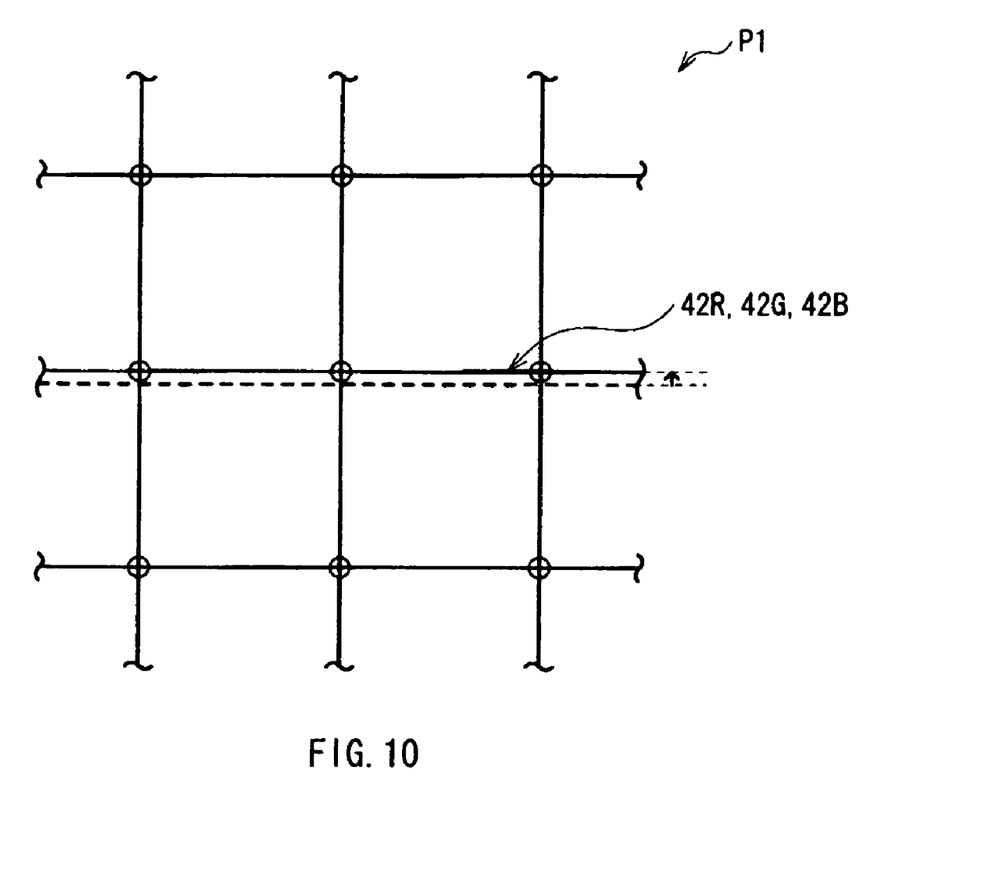
FIG. 10 is an enlarged diagram of a display screen after the registration adjustment is performed on the example of the display screen shown in FIG. 8.

For example, in the foregoing embodiment, the registration adjustment in the horizontal direction for reducing (eliminating) the misregistration in the horizontal direction (H direction) has been described. Also in the case such that misregistration occurs in the blue light line 42B in the vertical direction (V direction) (in this case, misregistration in the "−" direction) among the red light line 42R, the green light line 42G, and the blue light line 42B as shown in FIG. 8, in a manner similar to the foregoing embodiment, for example, the registration adjustment in the vertical direction is performed using an adjustment menu 34 and a selected point P2 on a display screen 3C shown in FIG. 9. By the adjustment, the misregistration in the vertical direction of the blue light line 42B is reduced (eliminated) and out-of-color-registration is suppressed. Thus, the display quality may be improved.

In the foregoing embodiment, the case of performing the registration adjustment in the "+" direction in order to reduce (eliminate) the misregistration in the "−" direction has been described. On the contrary, registration adjustment in the "−" direction in order to reduce (eliminate) the misregistration in the "+" direction may be performed in a manner similar to the embodiment, and similar effects may be obtained.

In the foregoing embodiment, the case of selecting a color to be adjusted by the user at the time of registration adjustment and, after that, selecting a position to be adjusted (adjustment point) as shown in FIG. 2 has been described. For example, in the opposite order, it is also possible to select a position to be adjusted (adjustment point) and, then, select a color to be adjusted.

Although the so-called three-chip projection display apparatus (projector) has been described in the embodiment, the type of the projection display apparatus is not limited to the above. The invention is also applicable to projection display apparatuses of other types if there is the possibility that misregistration occurs between primary color lights projected on a screen.

Further, in the embodiment, the case where the spatial light modulation devices are liquid crystal elements (the liquid crystal elements 14R, 14G, and 14B) and are configured as a liquid crystal apparatus (liquid crystal projector 1) has been described. As another spatial light modulation device, for example, a DMD (Digital Micromirror Device) may be used.

Obviously many modifications and variations of the present invention are possible in the light of the above teachings. It is therefore to be understood that within the scope of the appended claims the invention may be practiced otherwise than as specifically described.

What is claimed is:

1. A projection display apparatus comprising:
   a light source;
   a spatial light modulation device modulating, on the basis of a video signal, each of primary color lights for color display emitted from the light source;
   projecting means for projecting, onto a screen, each of the primary color lights modulated by the spatial light modulation device; and
   correcting means for correcting, based on a given correction value, the video signal for each of the primary color lights so as to perform a registration adjustment process to reduce misregistration between the primary color lights projected on the screen, and supplying the corrected video signal to the spatial light modulation device,
   wherein, at a time of performing the registration adjustment process when a setting menu including a validation/invalidation of correction setting is projected on the screen, validation/invalidation of correction on the video signal by the correcting means is switched in accordance with an operation from a user of the validation/invalidation of correction setting such that a registration adjustment based on the correction value is not performed and a video image displayed on a basis of the video signal before adjustment is held if invalidation of correction is selected by the user and a registration adjustment based on the correction value is performed to obtain an adjusted video signal and a video image of the adjusted video signal is displayed if validation of correction is selected by the user, so that a reset of the correction value is unnecessary after the correction value is once entered.

2. The projection display apparatus according to claim 1, wherein the spatial light modulation device includes liquid crystal elements, and
   the projection display apparatus is configured as a liquid crystal projector.

3. A projection display apparatus comprising:
   a light source;
   a spatial light modulation device modulating, on the basis of a video signal, each of primary color lights for color display emitted from the light source;
   projecting section projecting, onto a screen, each of the primary color lights modulated by the spatial light modulation device; and
   correcting section correcting, based on a given correction value, the video signal for each of the primary color lights so as to perform a registration adjustment process to reduce misregistration between the primary color lights projected on the screen, and supplying the corrected video signal to the spatial light modulation device,
   wherein, at a time of performing the registration adjustment process when a setting menu including a validation/invalidation of correction setting is projected on the screen, validation/invalidation of correction on the video signal by the correcting section is switched in accordance with an operation from the user of the validation/invalidation of correction setting such that a registration adjustment based on the correction value is not performed and a video image displayed on a basis of the video signal before adjustment is held if invalidation of correction is selected by the user and a registration adjustment based on the correction value is performed to obtain an adjusted video signal and a video image of the adjusted video signal is displayed if validation of correction is selected by the user, so that a reset of the correction value is unnecessary after the correction value is once entered.

* * * * *